United States Patent [19]

Dixon et al.

[11] Patent Number: 4,693,837
[45] Date of Patent: Sep. 15, 1987

[54] TERTIARY BUTYL DERIVATIVES OF TOLUENEDIAMINE AND MIXTURES AS ANTIOXIDANT FOR ORGANIC MATERIALS

[75] Inventors: Dale D. Dixon, Kutztown; William F. Burgoyne, Allentown, both of Pa.

[73] Assignee: Air Products and Chemicals, Inc., Allentown, Pa.

[21] Appl. No.: 937,769

[22] Filed: Dec. 4, 1986

[51] Int. Cl.$^4$ ............................................ C10M 133/12
[52] U.S. Cl. ...................................... 252/50; 252/401; 44/72
[58] Field of Search ...................... 252/50, 401; 44/72

[56] References Cited

U.S. PATENT DOCUMENTS

| | | | |
|---|---|---|---|
| 2,451,642 | 10/1948 | Watson | 252/50 |
| 2,645,674 | 7/1953 | Kinney | 260/759 |
| 3,230,257 | 1/1966 | Schmerling | 260/576 |
| 3,923,892 | 12/1975 | Klopfer | 260/578 |
| 4,411,805 | 10/1983 | Roberts | 252/50 |
| 4,456,541 | 6/1984 | Wright | 252/50 |

*Primary Examiner*—Jacqueline V. Howard
*Attorney, Agent, or Firm*—Russell L. Brewer; James C. Simmons; E. Eugene Innis

[57] ABSTRACT

This invention relates to the use of tertiary butyl derivatives of toluenediamine and specifically 5-tert-butyl-2,4-toluenediamine as an antioxidant material for preventing oxidation of organic materials.

6 Claims, No Drawings

TERTIARY BUTYL DERIVATIVES OF TOLUENEDIAMINE AND MIXTURES AS ANTIOXIDANT FOR ORGANIC MATERIALS

BACKGROUND OF THE INVENTION

1. Field of the Invention

This invention relates to the use of 5-tert-butyl-2,4toluenediamine as an antioxidant for the prevention of oxidation of organic materials.

2. Description of the Prior Art

Aromatic amines and N-alkylated aromatic amines have been long recognized as antioxidant materials for a variety of organic compositions such as rubber, plastics, fuel oil, lubricating oils, mineral oil, motor fuels and the like. The following patents are deemed representative of some of the prior art with respect to the use of aromatic amines as an antioxidant.

U.S. Pat. No. 2,645,674 discloses a method for producing a stabilized rubber adhesive composition by incorporating various amounts of aromatic diamine into the rubber as an antioxidant. Examples of aromatic amines include p-phenylenediamine; 1,5-naphthalenediamine; N-cyclohexyl-p-phenylenediamine and ortho-tolyl-$\beta$-naphthylamine.

U.S. Pat. No. 3,230,257 discloses the preparation of nuclear and N-alkylated aromatic amines and the use of these aromatic amines is antioxidants in mineral oil, lubricating oils, etc. Aromatic amines which are suitable for alkylation include 2,4-dibutylaniline and ethylated p-toluidine. Phenylenediamines are suggested as candidate amines.

U.S. Pat. No. 3,923,892 discloses the manufacture of alkylated aromatic amines and suggests their use as antioxidant materials. Examples of aromatic amines include methyl bis(aniline) and p-phenylenediamines. Diisobutylaniline and 2,3,5,6-tetraethyl-1,4-diaminobenzene are also suggested.

U.S. Pat. No. 4,456,541 discloses the use of various aromatic diamines as antioxidant materials, and specifically alkylated derivatives of toluenediamine. Of these aromatic diamines, the diethylated derivatives of the 2,4 and 2,6-isomers of toluenediamine are shown as being particularly effective antioxidant materials.

SUMMARY OF THE INVENTION

This invention relates to the use of 5-tert-butyl-2,4-toluenediamine as an antioxidant for the prevention of oxidation of organic materials e.g. rubber and hydrocarbon oils which are susceptible to gradual degradation in the presence of oxygen during use over an extended period of time and of the type in which aromatic diamines have been added as an antioxidant for hydrocarbon oils such as fuel oils, lubricating oils, etc. Although aromatic diamines have been known to exhibit antioxidant properties, 5-tert-butyl-toluenediamine is particularly effective as an antioxidant in that it imparts substantially extended oxidation times.

DETAILED DESCRIPTION OF THE INVENTION

The antioxidant material of this invention is 5-tert-butyl-2,4-toluenediamine and mixtures of that aromatic diamine with other aromatic diamines. Of particular usefulness is a mixture of 5-tert-butyl-2,4-toluenediamine and 3-tert-butyl-2,6-toluenediamine in a weight ratio of about 65–80% by weight of the 5-tert-butyl-2,4-toluenediamine and 20–35% by weight of the 3-tert-butyl-2,6-toluenediamine. The quantity of antioxidant toluenediamine derivatives incorporated into an organic substrate such as rubber or hydrocarbon oil will generally range from about 0.1–10%, preferably 0.25 to 5% by weight, although the amount can be varied in accordance with engineering procedure. Of course, as the level of aromatic diamine is reduced in the organic substrate, there may be a tendency to detract from the overall resistance to oxidation and levels above about 5 by weight may not significantly increase resistance to oxidation.

The aromatic diamine is incorporated into the organic substrate in conventional manner, and in those cases where the substrate is a solid, the use of a solvent may be required. Examples of suitable organic solvents include gasoline, petroleum naphtha, benzene, toluene, and chlorinated solvents such as propylene chloride and carbon tetrachloride. In addition, the antioxidant compound may be milled into rubber or other millable substrates. The aromatic diamine has particular utility in lubricating oils, fuel oils and mineral oils.

The following examples are provided to illustrate preferred embodiments of the synthesis and use of the aromatic diamines as an antioxidant material.

EXAMPLE 1

Synthesis of 3-tert-butyl-2,6-toluenediamine

Synthesis of the above recited ortho-tert-butyl-toluenediamine (hereinafter 3tBTDA) was carried out in a 1 gallon stainless steel pressure vessel equipped with a mechanical stirrer. The vessel was charged with a 150 gram portion of a powdered commercially available silica-alumina catalyst containing 13% alumina and 1500 grams (12.24 moles of 2,6-toluenediamine. The autoclave was sealed and purged with nitrogen. A residual blanket of nitrogen was left in the autoclave, leaving the pressure at 16 psig. the contents of the reactor were heated to a temperature of 200° C. with constant agitation. Isobutylene was then introduced into the reactor and 870 grams or 15.5 moles were added over a 30 minute period resulting in an initial reaction of pressure of 970 psig. This provided a mole ratio of 1.26:1 isobutylene to toluenediamine. The reaction mixture was maintained at 200° C. for about 45 hours with constant agitation.

At the end of the 45 hour reaction time the contents were cooled to about 150° C. and agitation discontinued. The reactor then was vented and the contents removed from the reactor. The catalyst was removed from the reaction mixture by filtration.

The reaction product was analyzed by gas chromatographic techniques and the following analysis was obtained:

|  | Mole % |
|---|---|
| 2,6-toluenediamine | 43.34 |
| 2-(tert-butylamino)-6-aminotoluene | 3.30 |
| 3-tert-butyl-2,6-toluenediamine | 42.36 |
| 3,5-di-tert-butyl-2,6-toluenediamine | 8.6 |
| 2-(tert-butylamino)-5-tert-butyl-6-aminotoluene | 1.82 |

The reaction product was then separated into its components by vacuum distillation.

EXAMPLE 2

Synthesis of 5-tert-butyl-2,4-toluenediamine

A 300 cc Hastalloy C pressure vessel equipped with a mechanical stirrer was used for producing 5-tert-butyl-2,4-toluenediamine. Approximately 100 grams or 0.819 moles of 2,4-toluenediamine were charged to the vessel along with 5 grams of 36% aqueous hydrochloric acid. The vessel was sealed and purged with nitrogen, leaving a 33 psig nitrogen blanket. The vessel contents then were heated to 180° C. with continuous stirring. Isobutylene then was introduced into the reactor and 53.4 grams or 0.96 moles were added over 15 minutes. On addition of the isobutylene, the pressure in the reactor increased to 766 psig. The reaction mixture was maintained at 180° C. for 24 hours with constant stirring. At the end of the 24 hour period the pressure had dropped to 524 psig. The contents were then cooled to 160° C. and stirring discontinued. At that time the reactor was vented and the reaction product analyzed for composition.

|  | Mole Percent |
| --- | --- |
| 2,4-toluenediamine | 50.70 |
| 2-(tert-butylamino)-4-aminotoluene | 1.84 |
| 2-amino-4-(tert-butylamino)toluene | 12.71 |
| 5-tert-butyl-2,4-toluenediamine | 26.71 |
| 2,4-di(tert-butylamino)toluene | 1.31 |
| 2-(tert-butylamino)-5-tert-butyl-4-aminotoluene | 5.28 |
| 2-amino-5-tert-butyl-4-(tert-butyl-amino)toluene | 1.45 |

The reaction product was separated into its components by vacuum distillation.

EXAMPLE 3

Preparation of 5-tert-butyl-2,4-toluenediamine

The procedure of Example 1 was followed to produce toluenediamine (5tBTDA) by using 15 grams of powdered montmorillonite clay in place of the silica-alumina catalyst and using 150 g (1.23 moles) of the 2,4-toluenediamine isomer as opposed to the 2,6-isomer. As in Example 1, the reaction contents were purged with nitrogen and then the contents were heated to 180° C. with stirring. Approximately 278 grams or 4.95 moles of isobutylene were then added to the reaction mixture over 20 minutes. The initial reaction pressure increased to 1210 psig and the contents maintained 180° C. for 23 hours. At that time the contents were cooled 150° C. and the reactor vented. The catalyst then was removed by hot filtration.

The reaction product was analyzed and contained the following:

|  | GC Area % |
| --- | --- |
| 2,4-toluenediamine | 48.47 |
| 2-(tert-butylamino)-4-aminotoluene | 6.71 |
| 2-amino-4-(tert-butylamino)toluene | 22.35 |
| 5-tert-butyl-2,4-toluenediamine | 20.61 |
| di-tert-butylated products | 1.86 |

The reaction product was then separated into its components.

EXAMPLE 4

Alkylation of a 80:20 Mixture of the 2,4- and 2,6-isomers of toluenediamine with Isobutylene over H-Y zeolite A 15.0 g. portion of H-Y zeolite (powder) 120.0 g. (0.98 mol) of 2,4-toluenediamine, and 30.0 g. (0.25 mol) of 2,6-toluenediamine were charged to a 1000 cc Hastalloy C pressure vessel equipped with a mechanical stirrer. The vessel was sealed and purged with nitrogen, leaving a 217 psig nitrogen blanket. The contents were heated to 180° C. with stirring. Isobutylene (280 g., 4.98 mol) was then added over 15 minutes, resulting in an initial reaction pressure of 1271 psig. The reaction mixture was maintained at 180° C. for 18 hours with constant stirring and then cooled to 150° C. Stirring was discontinued at this time and the residual pressure was vented. Upon removal of the catalyst by hot filtration, a product mixture of the following composition was obtained:

|  | Mole % |
| --- | --- |
| 2,4-toluenediamine | 19.09 |
| 2,6-toluenediamine | 6.30 |
| 2-(tert-butylamino)-4-aminotoluene | 2.03 |
| 2-amino-4-(tert-butylamino)toluene | 8.11 |
| 5-tert-butyl-2,4-toluenediamine | 48.79 |
| 3-tert-butyl-2,6-toluenediamine | 12.73 |
| 2-(tert-butylamino)-5 tert-butyl-4-aminotoluene | 1.60 |
| 2-amino-5-tert-butyl-4-(tert-butylamino)toluene | 0.55 |
| 2-(tert-butylamino)-5-tert-butyl-6-aminotoluene | trace |
| 3,5-di-tert-butyl-2,6-toluenediamine | 0.81 |

The mono ring-tert-butyltoluenediamines were isolated as a mixture by vacuum distillation.

EXAMPLE 5

Preparation of 5-tert-butyl-2,4-toluenediamine

A 15.0 g. portion of powdered H-Y zeolite and 150.0 g. (1.23 mol) of 2,4-toluenediamine were charged to a 1000 cc. Hastalloy C pressure vessel equipped with a mechanical stirrer. The vessel was sealed and purged with nitrogen leaving a residual 225 psig nitrogen blanket. The vessel contents were heated to 180° C. with stirring at 500 rpm. Isobutylene (279.0 g., 4.98 mol) was then added over 2 hours, resulting in 1225 psig vessel pressure. This provided a mole ratio of 4.05 isobutylene to 1 moles toluenediamine. The reaction mixture was maintained at 180° C. for 16 hours with constant stirring. The contents were cooled to 150° C. and then stirring was discontinued and the residual pressure vented. Removal of the catalyst by hot filtration afforded the following product mixture:

|  | Mole % |
| --- | --- |
| 2,4-toluenediamine | 15.59 |
| 2-(tert-butylamino)-4-aminotoluene | 1.66 |
| 2-amino-4-(tert-butylamino)toluene | 8.02 |
| 5-tert-butyl-2,4-toluenediamine | 71.60 |
| 2,4-di(tert-butylamino)toluene | 0.20 |
| 2-(tert-butylamino)-5-tert-butyl-4-aminotoluene | 1.38 |
| 2-amino-5-tert-butyl-4-(tert-butylamino)toluene | 0.55 |

EXAMPLE 6

Preparation of 3-tert-butyl-2,6-toluenediamine

A 15.0 g. portion of powdered H-Y zeolite catalyst and 140.0 g. (1.15 mol) of 2,6-toluenediamine were charged to a 1000 cc Hastalloy C pressure vessel equipped with a mechanical stirrer as was done in Example 2. The vessel was sealed and purged with nitrogen leaving a residual 200 psig nitrogen blanket at room temperature. The contents were heated to 180° C. with stirring. Isobutylene (267 g., 4.76 mol) was then added to the reaction mixture over 20 minutes, resulting in an initial reaction pressure of 1100 psig. This provided a molar ratio of 4.1:1 isobutylene to toluenediamine. The reaction mixture was maintained at 180° C. for 39 hours with content stirring. The reaction product was isolated by the procedure used in Example 1 and consisted of the following composition:

|  | Mole % |
| --- | --- |
| 2,6-toluenediamine | 30.48 |
| 2-(tert-butylamino)-6-aminotoluene | 9.79 |
| 3-tert-butyl-2,6-toluenediamine | 56.13 |
| 2-(tert-butylamino)-5-tert-butyl-6-aminotoluene | 1.19 |
| 3,5-di-tert-butyl-2,6-toluenediamine | 1.28 |

EXAMPLE 7

Antioxidant Testing in Oil

The test candidate toluenediamines, were evaluated for antioxidant properties for hydraulic oil. The evaluation was performed by the ASTM method D2272-67 entitled "Oxidation Stability of Steam Turbine Oils by Rotating Bomb" using Sunvis 21 (a light hydraulic oil) as the test oil. A good antioxidant will have an oxidation inhibition time (RBOT) greater than 150 min. at 0.5 wt. % utilization. The RBOT value of an antioxidant reflects its antioxidant capacity.

The chemicals designation and their respective test results at 0.5% by weight unless otherwise indicated are tabulated as follows:

| Test Compound (0.5 wt % in Mineral Oil) | RBOT Time (min) |
| --- | --- |
| 5-tert-butyl-2,4-toluenediamine | 277 |
| 3,5-diethyl-2,6-toluenediamine | 215 |
| 5-isopropyl-2,4-toluenediamine | 215 |
| 3,5-diethyl-2,4-toluenediamine | 175 |
| 3-isopropyl-2,6-toluenediamine | 170 |
| 3-tert-butyl-2,6-toluenediamine | 155 |
| Agerlite Stalite S* | 151 |
| 2,6-toluenediamine | 150 |
| 2,4-toluenediamine | 118 |
| 5-tert-butyl-3,4-toluenediamine | 90 |
| Control Medium - Sunvis 21 Mineral Oil without antioxidant additive | 33 |
| 3,5-di-tert-butyl-2,6-toluenediamine | 16 |

| Test Compound | wt % in Mineral Oil | RBOT Time (min) |
| --- | --- | --- |
| TBTDA** | 0.5 | 210 |
|  | 1.0 | 390 |
| DETDA*** | 0.5 | 160 |
|  | 1.0 | 308 |

*a commercially available antioxidant comprised of octylated diphenylamines
**80/20 mixture of 5-tert-butyl-2,4-toluenediamine/3-tert-butyl-2,6-toluenediamine (TBTDA)
***80/20 mixture of 3,5-diethyl-2,4-toluenediamine/3,5-diethyl-2,6-toluenediamine (DETDA)

Of the above test compounds, it can be seen that 5-tert-butyl-2,4 toluenediamine has the best RBOT time in minutes and is significantly better than other aromatic diamines including the diethyltoluenediamines specifically referred to in the prior art, i.e., U.S. Pat. No. 4,456,541. The data also shows the antioxidant activity of an 80/20 mixture imports good antioxidant characteristics and that RBOT times increase with increasing concentration. Surprising the ditertiary butyl derivative of 2,6-toluenediamine actually accelerated oxidation rather than prevented oxidation in view of the fact that the control without any antioxidant material had an RBOT time of 33 minutes. Thus, the data show the monotertiary butyl derivative of toluenediamine, and specifically the 5-tert-butyl-2,4-toluenediamine has greater antioxidant capacity than its structural isomer, i.e., the 2,6 derivative of toluenediamine and significantly better than the isopropyl derivatives. To summarize, the above data show that 5-tert-butyl-2,4-toluenediamine is extremely effect as an antioxidant for oils.

EXAMPLE 8

Antioxidant Testing in Natural Rubber

Numerous test candidate toluenediamines, were evaluated for antioxidant properties for rubber. The evaluation was performed by a conventional ASTM method and compared against the commercial antioxidants Agerite Superlite Solid and Agerite Stalite S.

The sample compositions evaluated in this experiment are listed below.

| Compound | Sample No. |
| --- | --- |
| Control | 1 |
| Agerite Superlite Solids* | 2 |
| Agerite Stalite S* | 3 |
| 5-tert-butyl-2,4-toluenediamine (5TB24TDA) | 4 |
| 3-tert-butyl-2,6-toluenediamine (3TB26TDA) | 5 |
| 5-isopropyl-2,4-toluenediamine (5IP24TDA) | 6 |
| 3-isopropyl-2,6-toluenediamine (3IP26TDA) | 7 |
| 3,5-diisopropyl-2,4-toluenediamine (35DIP24TDA) | 8 |
| 3,5-diisopropyl-2,6-toluenediamine (35DIP26TDA) | 9 |
| 80:20 mixture of 5-tert-butyl-2,4-toluenediamine and 3-tert-butyl-2,6-toluenediamine (TBTDA) | 10 |

*commercially available antioxidant

These compounds were incorporated into a rubber material and evaluated in accordance with the test procedures in Tables 1 and 2 which follow.

TABLE 1

Antioxidants in Natural Rubber

| Sample No. | 1 | 2 | 3 | 4 | 5 | 6 | 7 | 8 | 9 | 10 |
| --- | --- | --- | --- | --- | --- | --- | --- | --- | --- | --- |
| Smoked Sheet | 100 | 100 | 100 | 100 | 100 | 100 | 100 | 100 | 100 | 100 |
| Stearic Acid | 2 | 2 | 2 | 2 | 2 | 2 | 2 | 2 | 2 | 2 |
| Zinc Oxide | 5 | 5 | 5 | 5 | 5 | 5 | 5 | 5 | 5 | 5 |
| TiO$_2$ | 20 | 20 | 20 | 20 | 20 | 20 | 20 | 20 | 20 | 20 |
| DIXIE CLAY | 50 | 50 | 50 | 50 | 50 | 50 | 50 | 50 | 50 | 50 |
| Camel WITE | 50 | 50 | 50 | 50 | 50 | 50 | 50 | 50 | 50 | 50 |

TABLE 1-continued

| | Antioxidants in Natural Rubber | | | | | | | | | |
|---|---|---|---|---|---|---|---|---|---|---|
| Sample No. | 1 | 2 | 3 | 4 | 5 | 6 | 7 | 8 | 9 | 10 |
| Sulfur | 2.75 | 2.75 | 2.75 | 2.75 | 2.75 | 2.75 | 2.75 | 2.75 | 2.75 | 2.75 |
| ALTAX | 1 | 1 | 1 | 1 | 1 | 1 | 1 | 1 | 1 | 1 |
| METHDYL TUADS | .1 | .1 | .1 | .1 | .1 | .1 | .1 | .1 | .1 | .1 |
| AGERITE SUPERLITE S | — | 2 | — | — | — | — | — | — | — | — |
| AGERITE STALITE S | — | — | 2 | — | — | — | — | — | — | — |
| 5tB24TDA | — | — | — | 2 | — | — | — | — | — | — |
| 3tB26TDA | — | — | — | — | 2 | — | — | — | — | — |
| 5IP24TDA | — | — | — | — | — | 2 | — | — | — | — |
| 3IP26TDA | — | — | — | — | — | — | 2 | — | — | — |
| 35DIP24TDA | — | — | — | — | — | — | — | 2 | — | — |
| 35DIP26TDA | — | — | — | — | — | — | — | — | 2 | — |
| TBTDA | — | — | — | — | — | — | — | — | — | 2 |

TABLE 2

| | Sample No. | | | | | | | | | |
|---|---|---|---|---|---|---|---|---|---|---|
| Physical Properties | 1 | 2 | 3 | 4 | 5 | 6 | 7 | 8 | 9 | 10 |
| Press cures at 153° C. (307° F.) Cured: 10 Minutes | | | | | | | | | | |
| 300% Modulus, psi | 990 | 890 | 910 | 950 | 820 | 1030 | 910 | 1070 | 990 | 910 |
| Tensile, psi | 2290 | 2390 | 2350 | 2350 | 2280 | 2440 | 2330 | 2430 | 2460 | 2300 |
| % Elongation | 490 | 540 | 500 | 510 | 520 | 510 | 500 | 500 | 510 | 510 |
| Hardness | 55 | 55 | 53 | 59 | 54 | 61 | 57 | 57 | 59 | 57 |
| After Aging 2 Days in Test Tubes @ 100° C. (212° F.) | | | | | | | | | | |
| Tensile, % Retained | 34 | 67 | 87 | 77 | 66 | 73 | 72 | 65 | 65 | 79 |
| Elongation, % Retained | 53 | 70 | 86 | 78 | 85 | 73 | 82 | 74 | 73 | 78 |
| Hardness, Points Changed | +3 | +9 | +9 | +9 | +5 | +7 | +9 | +11 | +6 | +8 |
| After Aging 4 Days in Test Tubes @ 100° C. (212° F.) | | | | | | | | | | |
| Tensile, % Retained | 21 | 49 | 69 | 59 | 44 | 61 | 52 | 58 | 52 | 63 |
| Elongation, % Retained | 24 | 56 | 72 | 67 | 62 | 63 | 66 | 66 | 59 | 69 |
| Hardness, Points Changed | +2 | +8 | +12 | +9 | +3 | +7 | +7 | +8 | +8 | +7 |
| G.E. Brightness - Before and After 24 Hours Under R.S. Lamp | | | | | | | | | | |
| Before Exposure | 54.7 | 54.6 | 55.8 | 39.5 | 42.3 | 43.2 | 38.4 | 49.6 | 46.5 | 43.6 |
| After Exposure | 31.9 | 26.8 | 26.4 | 6.0 | 4.4 | 6.4 | 3.9 | 16.9 | 15.5 | 7 |

In the preliminary test shown, 5-tert-butyl-2,4-toluenediamine is shown to be more effective than the control (Sample 1) and about equal to other aromatic diamines.

What is claimed is:

1. In an organic material normally susceptible to gradual degradation in the presence of oxygen during use over an extended period of time and of the type in which an aromatic diamine has been added as an antioxidant, the improvement which comprises utilizing 5-tert-butyl-2,4-toluenediamine as said aromatic diamine.

2. The organic material of claim 1 wherein said aromatic diamine comprises a mixture of 65–80% 5-tert-butyl-2,4-toluenediamine and 20–35% of 3-tert-butyl-2,6-toluenediamine by weight.

3. The organic material of claim 1 wherein the level of aromatic diamine is from 0.1 to 10% by weight in said organic material.

4. The organic material of claim 1 wherein said organic material is a hydrocarbon oil and the level present in said hydrocarbon oil is from 0.25–5% by weight.

5. The organic material of claim 4 wherein said hydrocarbon oil is mineral oil.

6. The organic material of claim 4 wherein said hydrocarbon oil is a hydraulic oil.

* * * * *